United States Patent [19]

Pickering, Jr. et al.

[11] Patent Number: 5,321,252

[45] Date of Patent: Jun. 14, 1994

[54] IMPROVED DRIVER CIRCUITRY FOR MULTIPLE SENSORS

[75] Inventors: William Pickering, Jr., New Canaan; Christopher S. Riello, Hamden; Robert J. Tolmie, Jr., Brookfield; Mark W. Van Gorp, Danbury, all of Conn.

[73] Assignee: Pitney Bowes Inc., Stamford, Conn.

[21] Appl. No.: 56,723

[22] Filed: May 3, 1993

[51] Int. Cl.$^5$ ............................................. H01J 40/14
[52] U.S. Cl. .................................. 250/208.2; 250/561
[58] Field of Search ................... 250/208.2, 560, 561, 250/571; 356/430; 358/213.19

[56] References Cited

U.S. PATENT DOCUMENTS

| | | | |
|---|---|---|---|
| 3,972,622 | 8/1976 | Mason et al. ......................... 356/172 |
| 4,171,130 | 10/1979 | Jeschke et al. ......................... 271/10 |
| 4,559,451 | 12/1985 | Curl ..................................... 250/560 |
| 4,691,385 | 9/1987 | Tupman ............................... 356/152 |
| 4,691,912 | 9/1987 | Gillmann ............................. 271/10 |
| 4,886,976 | 12/1989 | Tolmie, Jr. .......................... 250/561 |

Primary Examiner—David C. Nelms
Assistant Examiner—Stephone B. Allen
Attorney, Agent, or Firm—Charles G. Parks, Jr.; Melvin J. Scolnick

[57] ABSTRACT

Improved Driver circuitry for multiple combination LED/silicon detector sensors arranged in an array or scattered in a machine, wherein the LEDs and detectors are connected in a matrix arrangement to common busses to reduce the number of connections and minimize interference. Grounding gates are toggled "ON" and "OFF" prior to actuating the driver circuitry to reduce the presence of live voice.

9 Claims, 2 Drawing Sheets

IMPROVED DRIVER CIRCUITRY FOR MULTIPLE SENSORS

FIELD OF THE INVENTION

This invention relates to driver circuitry for multiple sensors, and in particular to circuitry suitable for driving large numbers of sensors.

BACKGROUND OF THE INVENTION

Combination light-emitting diode (LED) and silicon photo detector components are commonly used as sensor units. A commercially available component places the LED and detector side by side, both facing in the same direction from a common active surface with the LED. When pulsed, the LED emits a narrow cone of light in one direction and the adjacent detector generates current when illuminated from the same direction. The unit is commonly used to sense the presence of a reflecting surface over the LED, by reflecting some of the intercepted radiation back toward the detector.

There are applications employing a large number of such combination units, which applications require selective activation by a controller of one or more units concurrently. Moreover, it is sometimes desirable to align the multiple units near or adjacent one another to form an array, and a problem then arises of minimizing the effect of scattered reflected radiation on detectors remote from the emitting LED. When large numbers of such combination units are present in a system, the number of connections from the controller to the units may become excessive.

A circuit has been developed for driving or operating a multiplicity of such units which reduces the number of connections from a driving or operating source to the units and which minimizes or reduces the effects of scattered light. The circuit is part of a system comprising multiple LED-detector units operated by an enabling micro controller with a relatively low number of connections. The micro controller provides for selection of one or more LEDs for activation and selection of one or more detectors for reading its output current, for use as multiple sensors in a closely arranged array in or scattered throughout a system.

Each unit typically has four leads, one each for the LED and the detector, respectively, to provide power or source current, and two of which are used for respective connection to a sink. Each LED is activated when its source and sink lead are activated, and each detector conducts current in its detector lead when its source and sink leads are activated, and its sink detector is connected to complete the circuit.

In a known system such as that described in U.S. Pat. No. 4,886,976, entitled "Driver Circuitry for Multiple Sensors", commonly assigned, the units are electrically arranged in a matrix in which each row of the matrix corresponds to a bank of the units, and each column of the matrix corresponds to units whose detector sink leads are connected in common. In this arrangement, each unit of a bank is alternately connected to one of two detector sink busses, and each LED sink lead is connected to one of four LED sink busses. If more than four are present, then the pattern repeats. All of the units in a column have their LED source leads connected in common to a source bus. The units in a column are also connected in common to the same source bus. Other electrically driven sensors, such as Hall-effect devices, can readily be added to the system and driven by the same matrix circuitry.

It has been empirically determined that the known system exhibits two anomalies. When incorporating the system in a high speed postage meter mailing machine, the sensors are principally used to monitor envelope flow through the mailing machine and determining physical properties of the envelope. As a result, sensor readings are taken at a very high rate. It has been observed that upon pulsing of he source line extraneous signals are initially produced which impacts both timing and system signal to noise ratio. In addition, due to the system timing requirements and the matrix arrangement, residue signals can be present on the data line further adversely effecting signal to noise ratios.

SUMMARY OF THE INVENTION

It is an objective of the present invention to present a sensor system of the type described above which removes the presents of extraneous signals when the source line is pulsed.

It is a further objective of the present invention to present a sensor system wherein the sensors are arranged in a matrix in which residue signals are eliminated from the data lines during data read cycles.

The sensor control system is comprised of a microprocessor based controller in bus communication with a conventional source driver, analog-to-digital converter and a sink driver. The sensors are comprised of an LED and silicon detector. The LED is comprised of a diode with a source lead and a sink lead, and a silicon detector, with a collector lead serving as the source lead and an emitter lead serving as the sink or output lead. The LED when pulsed emits a radiation or light beam directed to the detector to switch the detector "ON" thereby directing current to the data line. Immediately after pulsing of the source in response to the controller, a transistor is cycled "ON" and then "OFF" thereby grounding the data line resulting in the discharging of any extraneous or residue signals from the data line.

BRIEF DESCRIPTION OF THE DRAWINGS

These and other features and advantages of the invention will be better understood from the following detailed description of several preferred embodiments, taken in conjunction with the accompanying drawings wherein.

DETAILED DESCRIPTION OF THE PREFERRED EMBODIMENTS

Figure 1:
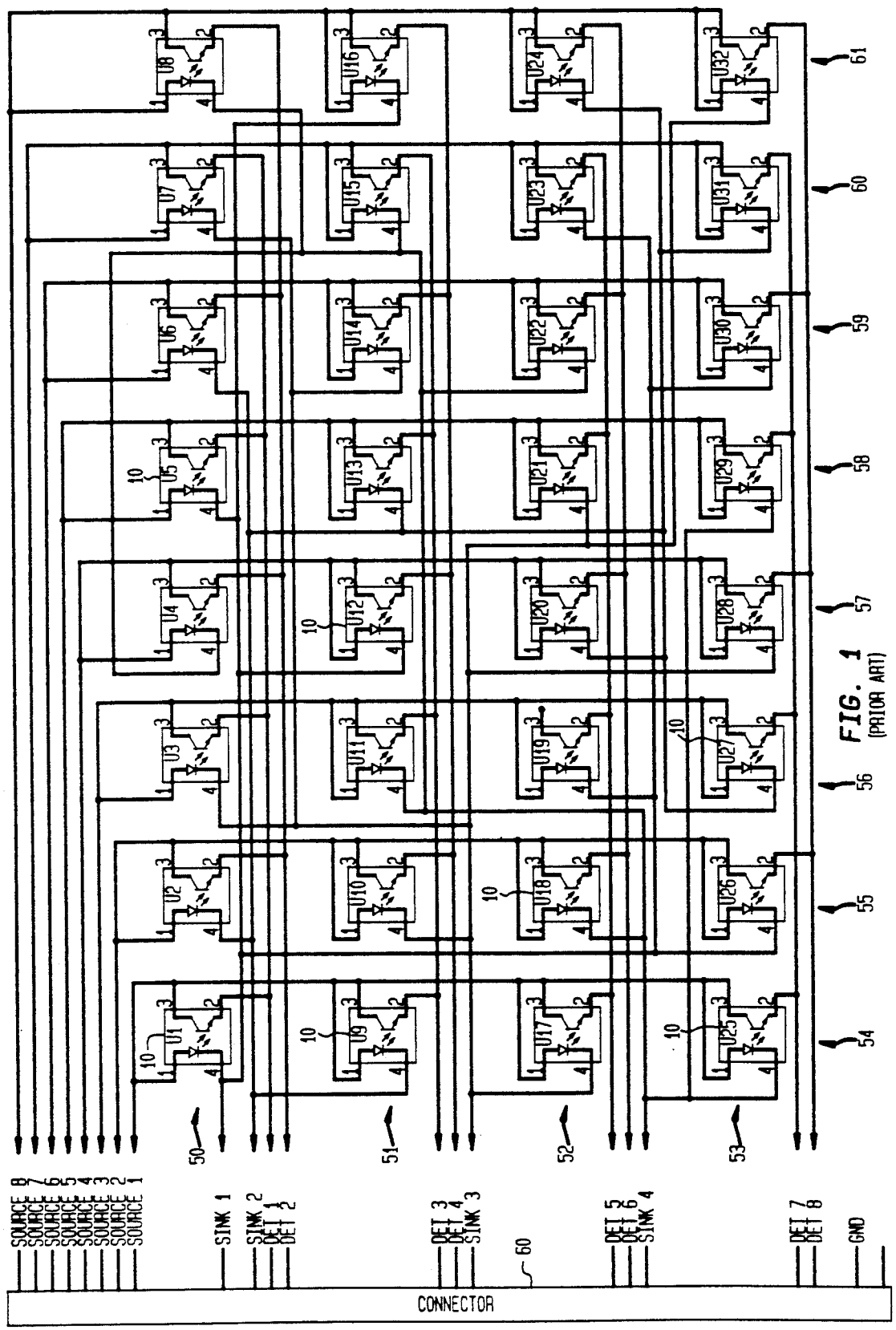
FIG. 1 is an electrical schematic of one form of a known driver circuitry.
Figure 2:
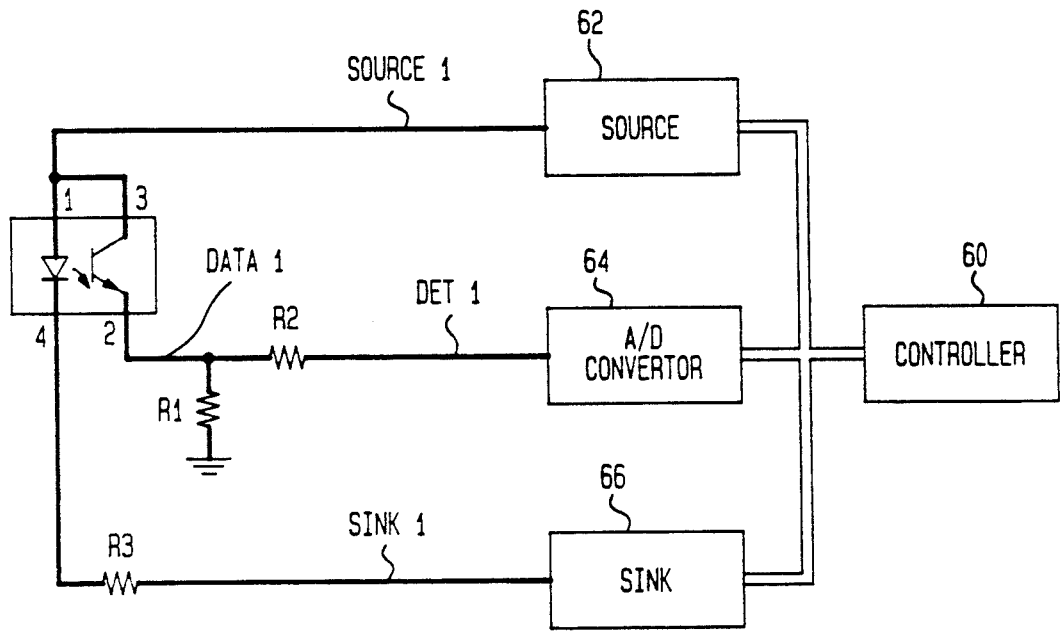
FIG. 2 is a diagram of a control system for the known driver circuitry.

Referring to FIGS. 1 and 2, in a known system such as that described in U.S. Pat. No. 4,886,976, entitled "Driver Circuitry For Multiple Sensors", commonly assigned and incorporated herein by reference, a plurality of units are electrically arranged in a matrix in which each row of the matrix corresponds to a bank of the units, and each column of the matrix corresponds to units whose detector sink leads are connected in common. A typical unit 10 is composed of an LED, shown as a diode with a source lead 1 and a sink lead 4, and a silicon detector, shown as a base-less transistor with a collector lead 3 serving as the source lead and an emitter lead 2 serving as the sink or output lead. In this matrix arrangement, each unit of a bank is alternately connected to one of two detector sink busses, and each LED sink lead is connected to one of four LED sink busses. If more than four are present, then the pattern repeats. All of the units in a column have their LED source leads connected in common to a source bus. The units in a column are also connected in common to the same source bus. Other electrically driven sensors, such as Hall-effect devices, can readily be added to the system and driven by the same matrix circuitry.

Briefly described here, the system described in U.S. Pat. No. 4,886,976 is comprised of 32 units designated U1–U32, electrically arranged in a 4×8 matrix comprising 4 rows 50–53 of 8 columns 54–61 of units, with the first row 50, sometimes referred to as the first bank, comprising units U1–U8, and the second row 51 comprising units U9–U16, and so on. Each unit has four leads designated as follows: 1 to the anode side of the LED, 4 to the cathode side, 3 to the collector of the detector transistor and 2 to the emitter. Arrows are present to show the optical connection, which exist only when a reflector is located above the unit.

For the 4×8 array shown, 8 source busses Source 1–Source 8 are provided. Each source bus is connected to the source lines 1 and 6 of each unit in a column. Thus, Source 1 bus is connected to the source leads 1, 3 of units U1, U9, U17, U25. The other source bus connections are evident from FIG. 1.

Sink busses 1–4 are provided for the LEDs, but connected to the LEDs in a pattern to space the connected LEDs apart, preferably as far apart as possible. Thus, the Sink 1 bus is connected to the LED Sink leads 4 of units U1, U5, U12, U16, U19, U23, U26, and U30, Sink 2 bus to units U2, U6, U9, U13, U20, U24, U27 and U31; and so on. In addition, 8 detector busses Det 1–8 are provided, each detector bus being connected to alternate units in a row, i.e., two detector busses per row. Thus, Det 1 bus is connected to the detector sink leads 2 of units U1, U3, U5 and U7 in row 50, Det 2 bus to units U2, U4, U6 and U8 in row 51, Det 3 and 4 busses to rows 52 and 53 in a similar arrangement.

Thus, for the 32 units shown, instead of 128 connections, only 8+4+8=20 lines to the external system controller 60 are required, a saving of 108 lines to the controller.

FIGS. 1 and 2 illustrates, in simplified form for the purpose of illustration, a control system as applied to U1 of the sensor matrix, however the application of the control system to the full matrix will be readily appreciated. In a typical operation, the controller 60 would activate source bus 1 by causing a source driver 62 to applying 5 volts to source bus 1. Either the detector busses would be selected depending on position and function of the unit, or all detector buses could be connected to a suitable circuit for reading analog currents, or for converting the analog currents through an A/D converter 64 to a digital value and then reading the digital value. These circuits typically would be connected between the detector busses and the controller 60, with the resultant digital value passed on to the controller. In either case, at this point in time, none of the LEDs are activated, since none of the sink busses are grounded. It has been determined that even though none of the detectors may be active the ambient current or background radiation may be flowing in the 8 detector busses.

Next, one LED sink bus is activated, as by grounding, say Sink 1 by the sink switch 66. The only LEDs emitting would be those whose source lead and sink leads are both activated. For the case illustrated, Source 1 bus activates units U1, U9, U17, U25, Sink 1 bus activates units U1, U5, U12, U16, U19, U23, U26, U30; it is thus evident that only unit U1 has its LED source and sink lines simultaneously activated, thus only the LED in U1 turns on. It is considered beneficial that even though the number of connections has been drastically reduced, it is possible to turn on any single LED or detector desired in the 32 unit matrix.

Referring now to FIG. 2, the control system includes resistor R1 interposed in the data line 1 and a resistor R2 interposed between the data line 1 and ground. A third resistor R3 is interposed in the sink line 1. It should be appreciated that the resistors R1, R2 and R3 are provided for the purpose of system balance. It should be appreciated that respective resistors R1, R2 and R3 are applied to the respective data and sink lines in like manner to data line 1 and sink line 1.

Figure 3:
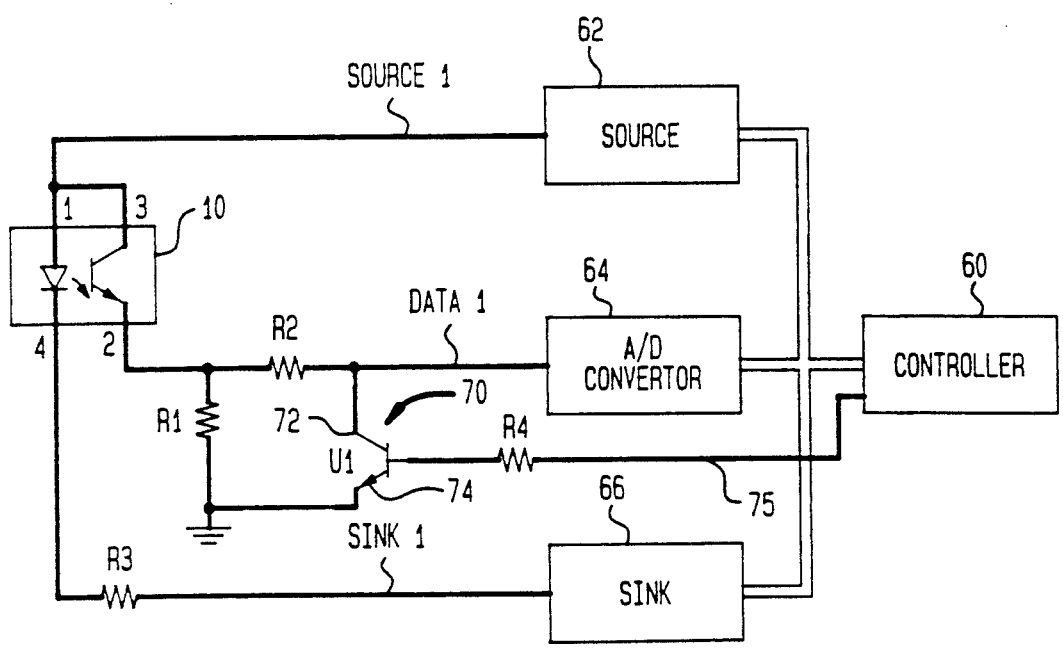
FIG. 3 is a diagram of an improved control system for a driver circuitry in accordance with the present invention.

Referring now to FIG. 3, the control system has been improved by providing a gating member, such as, a transistor 70, having the collector 72 connected to the Data line 1 and the emitter 74 connected to ground. The base of the transistor 70 is connected to the controller 60 through a line 75 and resistor R4. It should be appreciation a respective transistor 70 is coupled in like manner to each data line 1 through 8 to act in like manner as subsequently described.

It can now be appreciated that prior to actuating any of the units 10, the controller is programmed to cycle the respective transistor 72 "ON" and "OFF" to thereby ground the data line prior to actuation the respective units 10. Grounding the respective data line discharges any residue and/or extraneous signals from the data line. The size of R1 should be selected to linearize the voltage that is input to the A/D convertor.

The above description describes the preferred embodiment of the invention and should not be view as limiting. The scope of the invention is set forth in the appendix claims.

What is claimed is:

1. An improved driver circuitry for sensors, said driver having a sensor having a radiation generating and radiation detecting means and source leads for applying source current to the radiation generating and detecting means and sink leads for the source current, a source bus, a sink bus, a detector bus, means connecting the source bus to the radiation generating source lead, means connecting the detector sink lead, wherein the improvement comprises:

source means connected to said source bus for supplying voltage to said source bus when said source means is actuated, gate means connected between detector bus and ground;

programmable microcontroller connected to said gate means and said source means, said gate means and said source means being responsive to said microcontroller, and said microcontroller being programmed to sequentially close and open said gate means just prior to causing said source means to actuate.

2. An improved driver circuitry for sensors, said driver having a plurality of sensors each having a radiation generating and radiation detecting means and source leads for applying source current to the radiation generating and detecting means and sink leads for the source current, said sensors being arranged in a matrix of rows and columns, a plurality of source busses, a plurality of sink busses, a plurality of detector busses, means connecting each of said source busses to the radiation generating source leads of one of the columns of sensors, means connecting the detector sink leads of alternate sensors in a column to one of said detector busses, wherein the improvement comprises:
  source means connected to said source busses for supplying voltage to said respective one of said source busses when said source means is actuated,
  gating means connected between respective ones said detector busses and ground;
  a programmable microcontroller connected to said gating means and said source means, said gating means and said source means being responsive to said microcontroller, and
  said microcontroller being programmed to sequentially cause said gate means to gate a respective detector bus of just prior to causing said source means to activate a corresponding source bus.

3. The improved circuit of claim 2 wherein the number of source busses equals the number of columns.

4. The circuit of claim 2 wherein the source leads of the detectors are connected to the same bus as the source leads of said radiation generating means.

5. The circuit of claim 2 wherein the sink leads of adjacent generators are connected to different sink busses.

6. The circuit of claim 4 wherein the connections to the generator sink leads are configured such that radiation generating means in adjacent rows and columns never generate at the same time.

7. The circuit of claim 2 wherein the radiation generators are LEDs, and the detectors are silicon detectors.

8. The circuit of claim 7 wherein Hall-effect detectors are connected to the matrix.

9. The circuit of claim 6 wherein the LEDs and silicon detectors are packaged together and face a common surface.

* * * * *